March 17, 1970  R. W. HYDE  3,500,582
METHOD OF APICAL GRAFTING
Filed Aug. 8, 1967  3 Sheets-Sheet 3
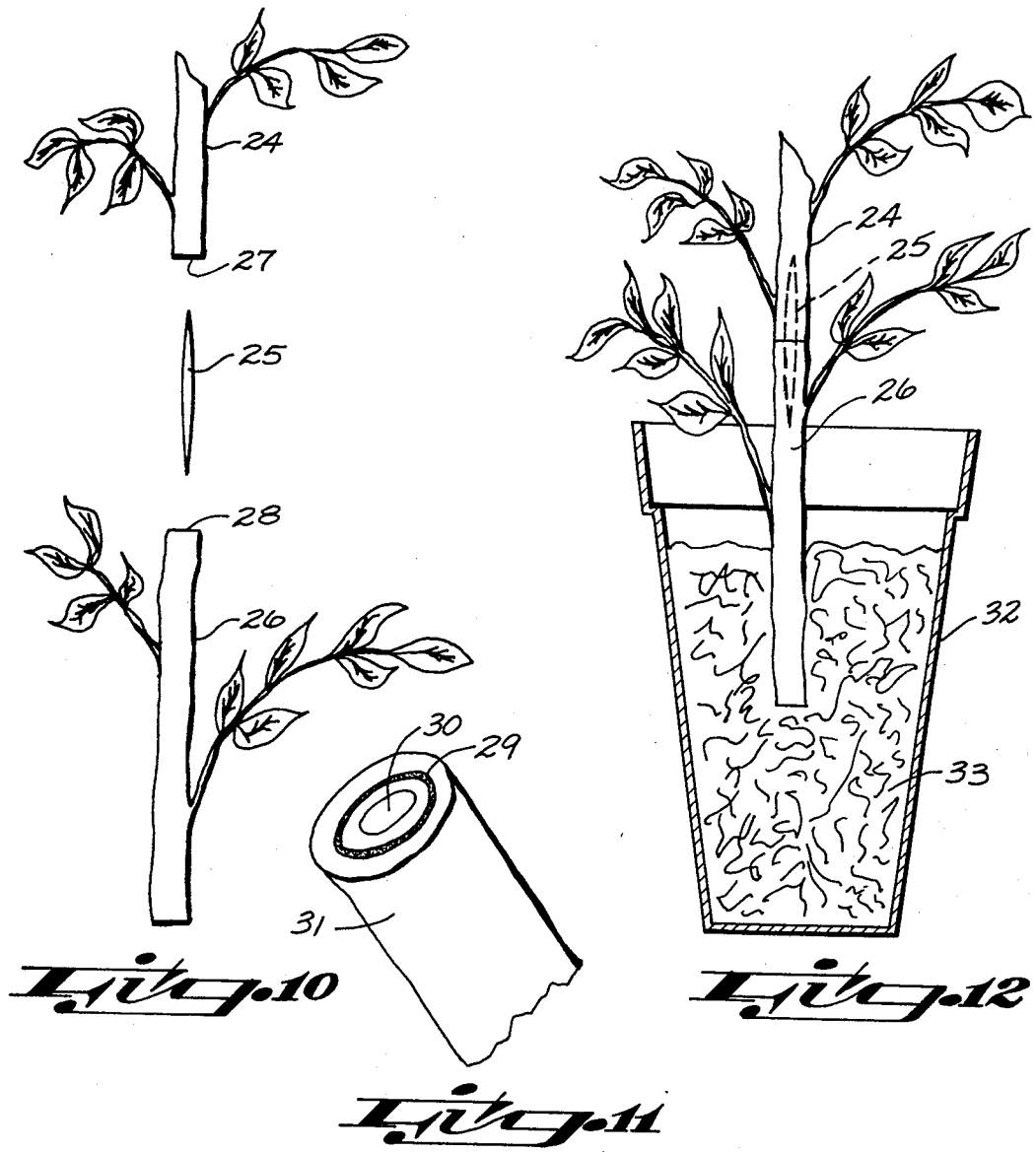
INVENTOR.
Robert W. Hyde
BY Wood, Herron & Evans
ATTORNEYS United States Patent Office 3,500,582
Patented Mar. 17, 1970

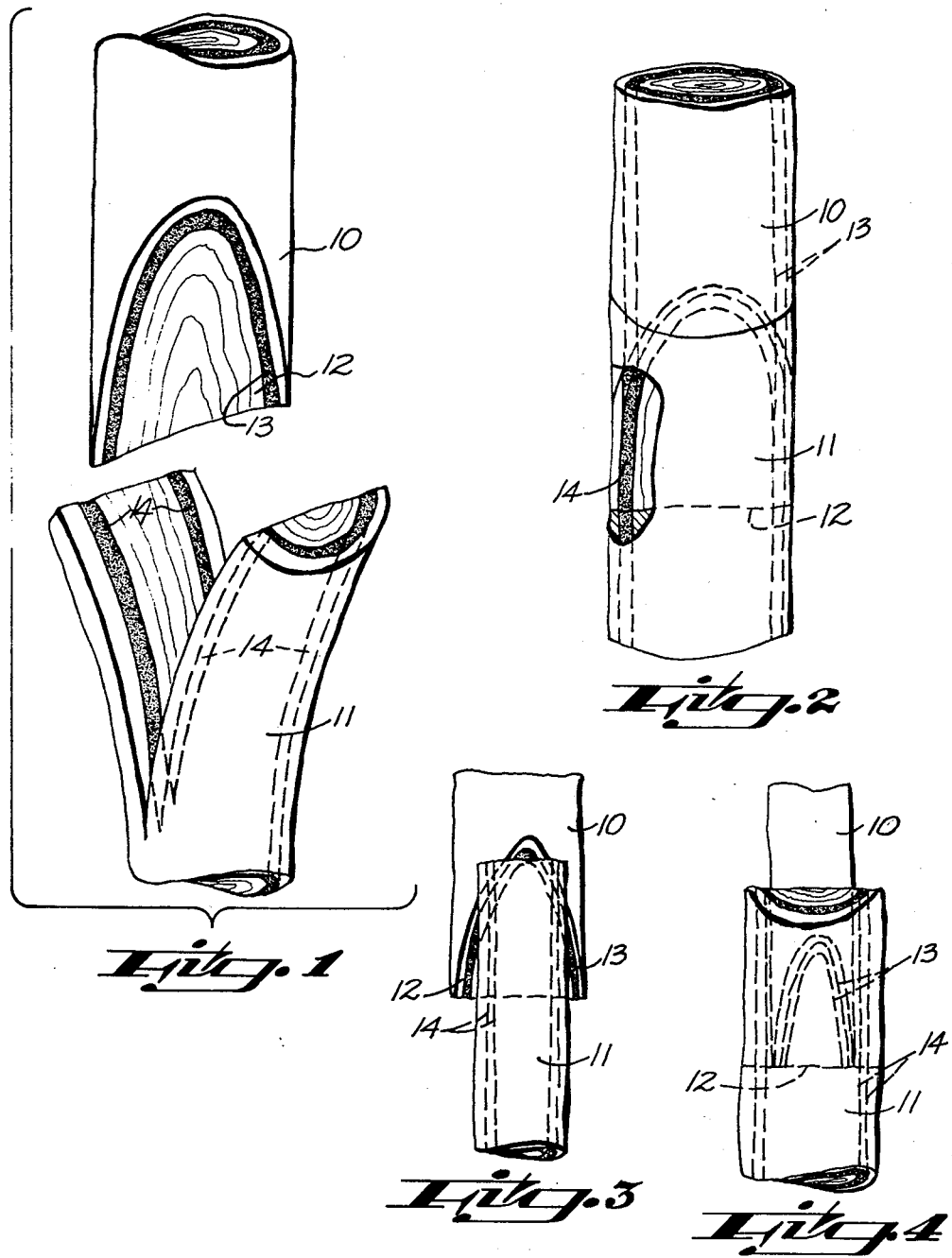

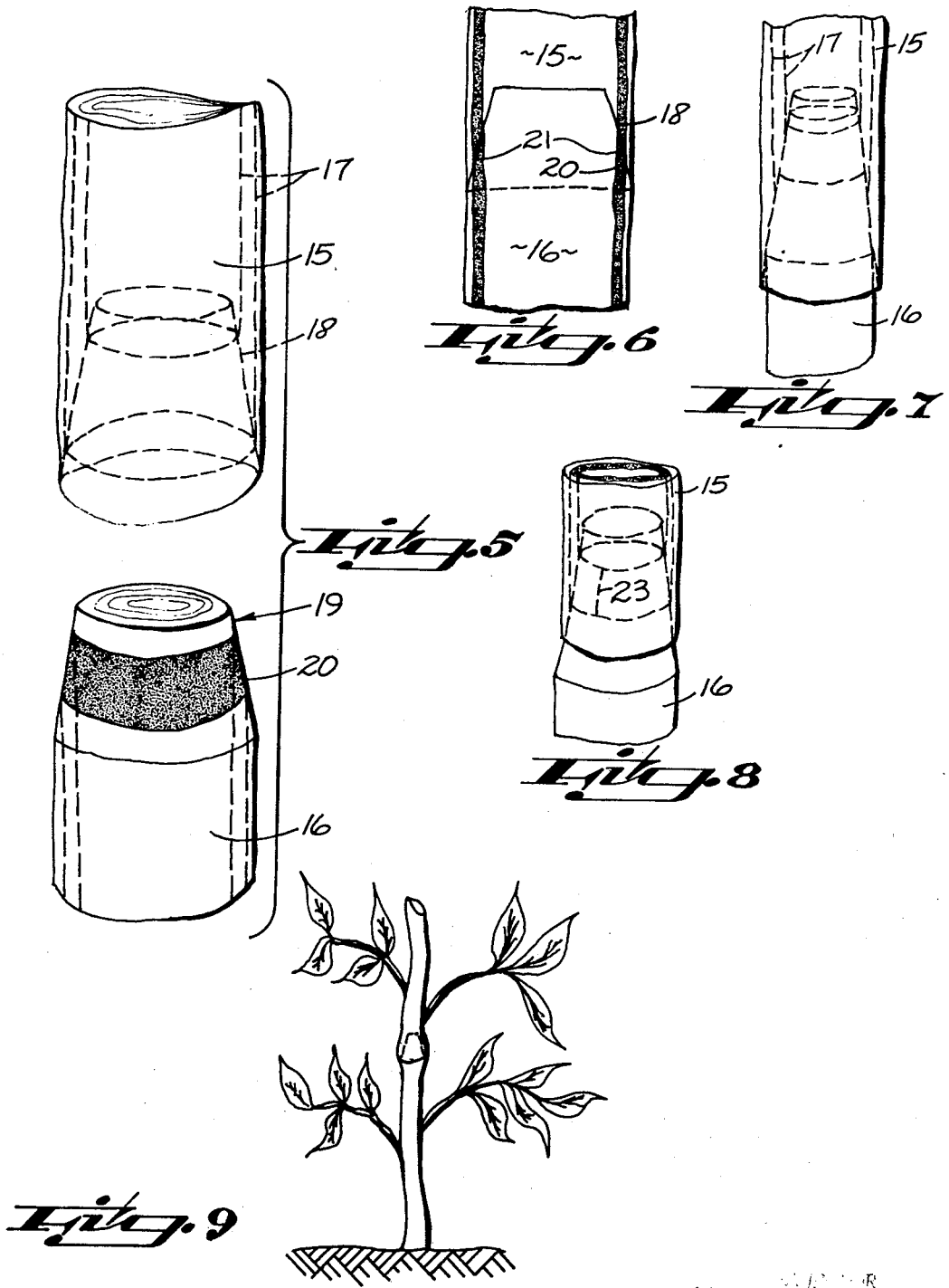

3,500,582
METHOD OF APICAL GRAFTING
Robert W. Hyde, Putter Place, Crystal River, Fla. 32629
Filed Aug. 8, 1967, Ser. No. 659,138
Int. Cl. A01g 1/06
U.S. Cl. 47—6        1 Claim

ABSTRACT OF THE DISCLOSURE

Methods of joining scion and understock, that are generally of the same diameter, first, wherein a tapered socket is formed in the lower end of the scion to expose a substantial length of cambium extending around the wall of the socket; the upper end of the understock is tapered to fit snugly within said socket and to expose a substantial length of cambium extending around said upper end; and then said upper and lower ends are forcibly joined to bring the respective cambium layers into intimate contact with one another, and the taper is of such an angle (less than 15° included angle) that the parts lock together. Second, wherein a non-metallic peg or double pointed toothpick-like piece is inserted half into the pithy center of the scion and the other half into the pithy center of the root stock and the two parts pressed tightly together and held in contact and alignment by this internal device. These two methods have in common that the respective cambium layers, of scion and understock, are brought together throughout 360° and in intimate contact.

Background of the invention

It is recognized that a successful graft is dependent primarily upon initially establishing a firm union between the cambium of the joined scion and understock. And it follows that the greater the area of contact between cambium, the greater the chances of success. Except for the budding technique, used primarily for roses, most all methods of grafting used in the past entail the formation of a wedge or a combination of wedge-like projections on the lower end of the scion and a matching wedge-shaped slot or slit in the upper end of the understock. Formed in this manner, the cambia are exposed as thin lines only and the lines thus exposed must mate when the scion is joined to the understock. As will be explained later, it is often the case that the lines of cambia merely cross one another instead of being coextensive with the result that there is little chance for the graft to "take." On the other hand, the budding of roses does unite comparatively large areas of the cambium of the understock to the cambium of the scion (a bud, in this case). But budding is an art, demanding highly skilled personnel, many of whom, in a commercial operation at least, work in teams. Further, all of the presently employed grafting methods require the use of wrapping materials to hold the joined members firmly together and, in most instances, a wax is used to coat the joint to prevent desiccation and the incursion of bacteria which cause infection and rot.

Summary of the invention

The objectives of the invention have been to:

(1) provide a method of joining a scion to an understock in which a maximum of cambium areas are firmly united with one another (2) provide a method of joining a scion to an understock in which the entire periphery of the cambium of one member is engaged by the entire periphery of the cambium of the other member, thereby producing an evenly balanced plant having a well-shaped, strong graft union (3) provide a method of grafting that does not require wrapping to hold the two members together (4) provide a method of grafting that lends itself to the use of mechanical means for preparing the members to be joined, whereby persons of little skill can produce successful grafts (5) provide a method of grafting that does not require the use of wax or other anti-desiccant when used to unite a rose scion to an understock.

Brief description of the drawings

FIGURE 1 illustrates a prior art method of preparing a scion and an understock for union.

FIGURE 2 is a diagrammatic illustration, in phantom, illustrating the type of joint made by uniting the scion and understock shown in FIGURE 1.

FIGURE 3 is a view similar to FIGURE 2 illustrating a prior art joint made using an oversized scion.

FIGURE 4 is a view similar to FIGURE 3 illustrating a prior art joint made using an undersized scion.

FIGURE 5 is a diagrammatic perspective view illustrating one method of preparing a scion and an understock in accordance with this invention.

FIGURE 6 is a diagrammatic cross-sectional view illustrating a joint made in accordance with a method of this invention.

FIGURE 7 is a diagrammatic view illustrating a joint made using an oversized scion.

FIGURE 8 is a diagrammatic view illustrating an undersized scion.

FIGURE 9 is a view illustrating a grafted rose plant in which the members are joined following a method of this invention.

FIGURE 10 is an exploded view showing a scion, a tapered plastic toothpick-like peg and a stock of a second method of grafting wherein the cambium layers are brought into contact throughout 360° around the joint.

FIGURE 11 is a fragmentary perspective view illustrating the cut end of a rose stock formed in accordance with the second method of this invention.

FIGURE 12 is a semi-diagrammatic view illustrating a scion stock joined in accordance with the second method of this invention, the stock residing in a pot containing rooting medium.

Description of the preferred embodiment

For the purposes of this disclosure, reference is made to the grafting of rose plants. However, the techniques disclosed are equally applicable to other plants that are presently being grafted, for one example, fruit trees.

FIGURES 1-4 show a widely used prior art method of forming a graft. A scion shown at 10 is selected that is of the same diameter as an understock 11. The lower end of the scion is cut by use of a knife to provide a wedged section 12. such cutting exposed the cambium 13. In FIGURES 1-4, the cambium layer is shown many times its usual width and its is stippled for illustration purposes. In actual practice, the cambium appears as a thin, parabolic line on both sides of the wedge section 12. The understock 11 is split, or a wedge-shaped slot cut into its upper end, to expose four lines of cambium, as shown at 14. When the scion 10 and understock 11 are joined, those areas of the cambium that make contact are shown in FIGURE 2.

Keeping in mind that the exposed cambium layers are in the form of thin lines, it can be seen that very little direct contact is made between these layers. Further, this contact is reduced considerably should the scion be oversized with respect to the understock. This situation is shown diagrammatically in FIGURE 3. Should the scion be undersized, as shown in FIGURE 4, no contact is possible between the cambium layers, unless it be at one side only of the joint with the scion off center. Although not shown, it is the practice to bind the type of joint illustrated in FIGURE 2 and then to cover the area of the joint with wax. Reference is now made to FIGURES 5-9 which illustrate a graft made in accordance with the principles of this invention.

A scion 15 is selected that is nearly the same diameter as an understock 16. The cambium of the scion 15 is shown by the dotted lines 17. Using a sharp, tapered drill (now shown), a tapered socket 18 is formed in the lower end of the scion 15. For reasons to be explained, a drill is used that forms a taper for the wall of the socket of between 5° and 10°, preferably nearer 5° than 10°. Formed in this fashion, the cambium of the scion is exposed around the entire periphery of the socket and for a substantial length of the depth of the socket, this being in contrast to the line exposure of the prior art. The understock is prepared, as shown in FIGURE 5, by forming its upper end 19 into a frusto-conical shape, the slant of which matches the taper of the wall of socket 18. Here again, the cambium layer, shown at 20, is exposed throughout the entire periphery of the understock 16 and for a substantial length of the frusto-conical upper end 19 of the understock. Thus prepared, the scion and understock are joined and firmly pushed together, which brings the exposed cambium layers into intimate contact with one another over substantial areas, far greater than the areas of contact afforded by prior art methods of grafting.

FIGURE 6 illustrates diagrammatically how, by cutting through the cambium on a plant, maximum areas of the respective cambium are exposed to one another in the graft joint. The heavy lines at 21—21 in FIGURE 6 represent areas of contact between the respective layers 18 and 20.

It is not necessary that the scion and understock be of exactly the same diameter. FIGURE 7 illustrates at 22 that substantial contact is made between the respective cambia 18 and 20 when the scion is substantially oversized. The same kind of contact is illustrated at 23 when the scion is undersized.

The method above described results in a self-locking joint between scion and understock due primarily to the taper used. That is, any taper between approximately 5° and approximately 10°, but not much over 10°, locks the joined members together so that they can be handled without fear of them coming apart. It is also found that if the socket of the scion is split by joining the two members with too great force, there is little effect on the integrity of the joint and such splitting soon heals.

FIGURES 10 through 12 illustrates a second method of joining a scion to a stock in order that there be contact between the cambia throughout 360°. (Attention is called to the fact that throughout the drawings the relative size and position of the cambium is exaggerated for better visual clarity.) As shown in FIGURE 10, the scion is designated 24. At 25 there is illustrated a double tapered plastic toothpick-like peg that preferably is from one to one and one-half inches long. At 26 there is illustrated an understock. The lower end of the scion is cut straight across as shown at 27. The upper end of the understock is cut in the same fashion as illustrated at 28.

Referring to FIGURE 11, the circle 29 designates the cambium of a typical understock. The center circle at 30 designates the dead pitch center of the understock and the numeral 31 designates the outer bark of the understock. (The cross section shown is equally applicable to the lower end of a scion.)

In making the joint, the tapered plastic toothpick-like peg is inserted half into the pith area of the scion and half into the pith area of the understock. By selecting a scion and stock having substantially the same diameters, when the two ends 27 and 28 are brought together, there is contact through 360° of the two cambium layers. This situation is illustrated in FIGURE 12 which shows a finished assembly of scion and understock ready for rooting and growth. In this figure, a typical pot is shown at 32 and conventional rooting medium at 33.

In the method just described, it is found that the tapered plastic tooth-pick-like peg has no inhibiting effect upon the rapid rooting and growth of the assembled scion and stock. Further, it holds the two securely together for handling purposes.

Roses are ideally suited to the methods of this invention. It is preferred, however, that a rose scion be selected that has at least two leaf clusters on it, one at either side, as illustrated in FIGURE 9. Once the scion and understock are joined, known techniques may be employed for rooting purposes, as shown in FIGURE 12.

Having described my invention, I claim:

1. The method of joining a scion to an understock comprising the steps of providing a pointed peg.

cutting across the lower end of the scion at an angle to its longitudinal axis, cutting across the upper end of the understock at an angle matching the angle of the scion cut, and embedding the upper end of said peg part way into the pith of the scion and the lower end of said peg into the pith of the understock such that the cambium layer of the scion is brought into intimate contact with the cambium layer of the understock throughout 360°.

References Cited

UNITED STATES PATENTS

| 107,427 | 9/1870 | Wagener | 47—6 |
| 1,594,548 | 8/1926 | Nixon | 47—6 |

FOREIGN PATENTS 120,133  10/1899  Germany.

ROBERT E. BAGWILL, Primary Examiner